United States Patent

Naiki et al.

[11] Patent Number: 5,969,843
[45] Date of Patent: Oct. 19, 1999

[54] LIGHT SOURCE DEVICE AND LIGHT BEAM SCANNING OPTICAL APPARATUS

[75] Inventors: Toshio Naiki; Akiyoshi Hamada; Yoshihiro Inagaki, all of Toyokawa, Japan

[73] Assignee: Minolta Co., Ltd., Osaka, Japan

[21] Appl. No.: 08/947,266

[22] Filed: Oct. 8, 1997

[30] Foreign Application Priority Data

Jan. 31, 1997 [JP] Japan .................................. 9-018429

[51] Int. Cl.[6] .................................................. G02B 26/08
[52] U.S. Cl. ........................ 359/196; 359/212; 359/216; 359/204; 362/250
[58] Field of Search .................................. 359/196–226, 359/811, 819, 822; 347/225, 233, 238, 241–245, 256–261; 362/227, 253, 249–250, 257, 259, 277, 281, 285–289, 372, 238–240

[56] References Cited

U.S. PATENT DOCUMENTS 4,907,017  3/1990  Azuma .
4,918,702  4/1990  Kimura ...................................... 372/34
5,255,015  10/1993  Noethen et al. .

Primary Examiner—James Phan
Attorney, Agent, or Firm—Sidley & Autin

[57] ABSTRACT

A light beam scanning optical apparatus which writes two lines at one scan on a photosensitive member with light beams emitted from two light sources. A light source unit of the apparatus has a first movable retainer block which retains a first laser diode and a second movable retainer block which retains a second laser diode. The second movable retainer block becomes adjustable two-dimensionally on a base block by loosening screws which fit the second movable retainer block to the base block.

17 Claims, 8 Drawing Sheets

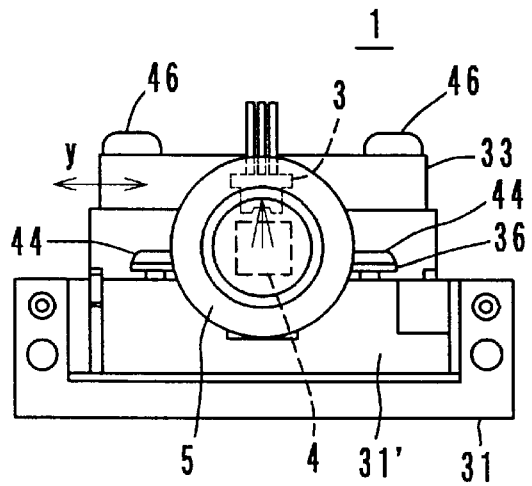
F I G. 6
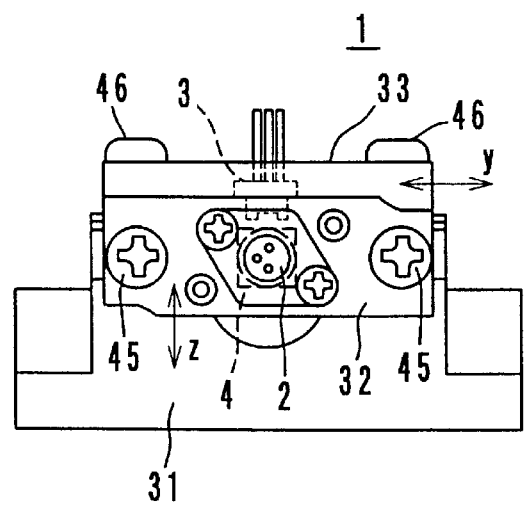
F I G. 7
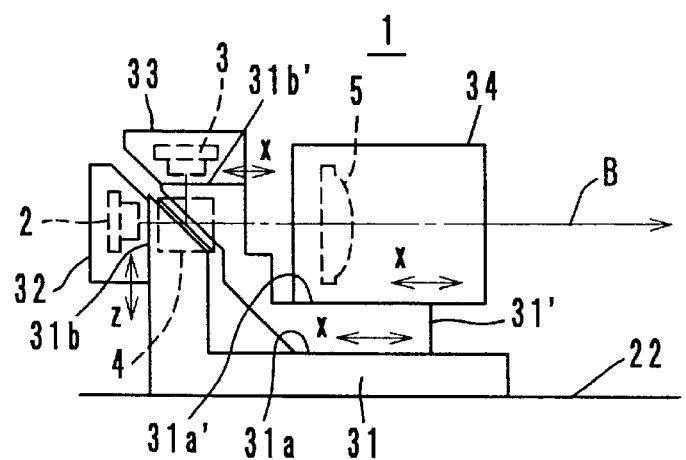
F I G. 8

LIGHT SOURCE DEVICE AND LIGHT BEAM SCANNING OPTICAL APPARATUS

BACKGROUND OF THE INVENTION

1. Field of the Invention

The present invention relates to a light source device and a light beam scanning optical apparatus, and in particular, to a light source device and a light beam scanning optical apparatus to be used as image writing means of a laser printer or a digital copying machine.

2. Description of Related Arts

Conventionally, a variety of light beam scanning optical apparatuses have been known as means for writing an image onto a photosensitive member. In those apparatuses, a light beam emitted from a light source unit is scanned as deflected by a polygon mirror and focused on a photosensitive member via an fθ-lens or the like. A variety of optical members are housed in a box-shaped housing 100 opened upward as shown in FIG. 15. For example, the light source unit and the polygon mirror are housed in a recess portion 101 and a recess portion 102 of the housing 100, respectively, and after completing various adjustment works, the housing 100 is enclosed by a lid member (not shown).

In recent years, there has been growing demands for increasing a pixel density and increasing an image writing velocity. In compliance with these demands, there has been developed a multi-beam type optical apparatus in which two light sources are provided and light beams emitted from the respective light sources are scanned as deflected in a state in which they are close to each other in a sub-scanning direction so as to write two lines during one scan.

In the multi-beam system, two light sources are housed in the aforementioned recess portion 101, where members for retaining the light sources (laser diodes) are required to be adjusted in position from the directions of arrows h, and he for positional adjustment of the light beams. However, the side walls of the housing 100 become an obstacle in this adjustment, and therefore, it has been required to form an opening in either one of the directions of arrows $h_1$ and $h_2$ and execute the adjustment by inserting an adjusting instrument such as a screwdriver through this opening. As described above, it has been hard and troublesome to execute the positional adjustment sideways after the light source unit has been assembled into the housing 100.

SUMMARY OF THE INVENTION

Accordingly, an object of the present invention is to provide a light source device and a light beam scanning optical apparatus capable of easy positional adjustment of the light source device.

In order to achieve the above object, the present invention provides a light source device to be placed on a horizontal reference surface of a box-shaped housing opened upward, in which a light source is mounted on a movable retaining member so as to emit a light beam in a direction approximately perpendicular to the horizontal reference surface, and the movable retaining member can be positionally adjusted, from above the housing, in a plane perpendicular to the beam emitting direction.

Furthermore, a light beam scanning optical apparatus of the present invention comprises: a box-shaped housing opened upward; a deflector which scans a light beam while deflecting the light beam in a plane approximately parallel to a floor surface of the housing; a light source which emits a light beam in a plane approximately perpendicular to a deflecting plane of the deflector; an optical element which reflects the light beam emitted from the light source so as to guide the light beam to the deflector; and a movable retaining member which retains the light source and is positionally adjustable, from above the housing, in a plane perpendicular to the beam emitting direction.

In the light source device and the light beam scanning optical apparatus having the above constructions, the movable retaining member which retains the light source is placed on the housing, and thereafter the exact position of the optical axis is adjusted from above the housing. Since the housing is widely opened upward, its side wall does not become an obstacle in positional adjustment in contrast to the prior art, allowing fine adjustment to be easily executed.

In particular, the present invention is relevant to a light source device and a light beam scanning optical apparatus of a multi-beam type provided with two light sources. The multi-beam system requires complicated adjustment to align the optical axes of the two light beams directed to a deflector. According to the present invention, after adjusting the optical axis of one light source, the optical axis of the other light source can also be adjusted from above the housing in a state in which the light source is assembled into the housing.

BRIEF DESCRIPTION OF THE DRAWINGS

This and other objects and features of the present invention will be apparent from the following description with reference to the accompanying/drawings, in which:

FIG. 6 is a right side view of the assembly structure of FIG. 5;

FIG. 7 is a left side view of FIG. 5;

FIG. 8 is a schematic view of the first example of the assembly structure shown in FIGS. 4 through 7;

DETAILED DESCRIPTION OF THE PREFERRED EMBODIMENTS

Preferred embodiments of the light source device and the light beam scanning optical apparatus of the present invention will be described below with reference to the accompanying drawings.

Figure 1:
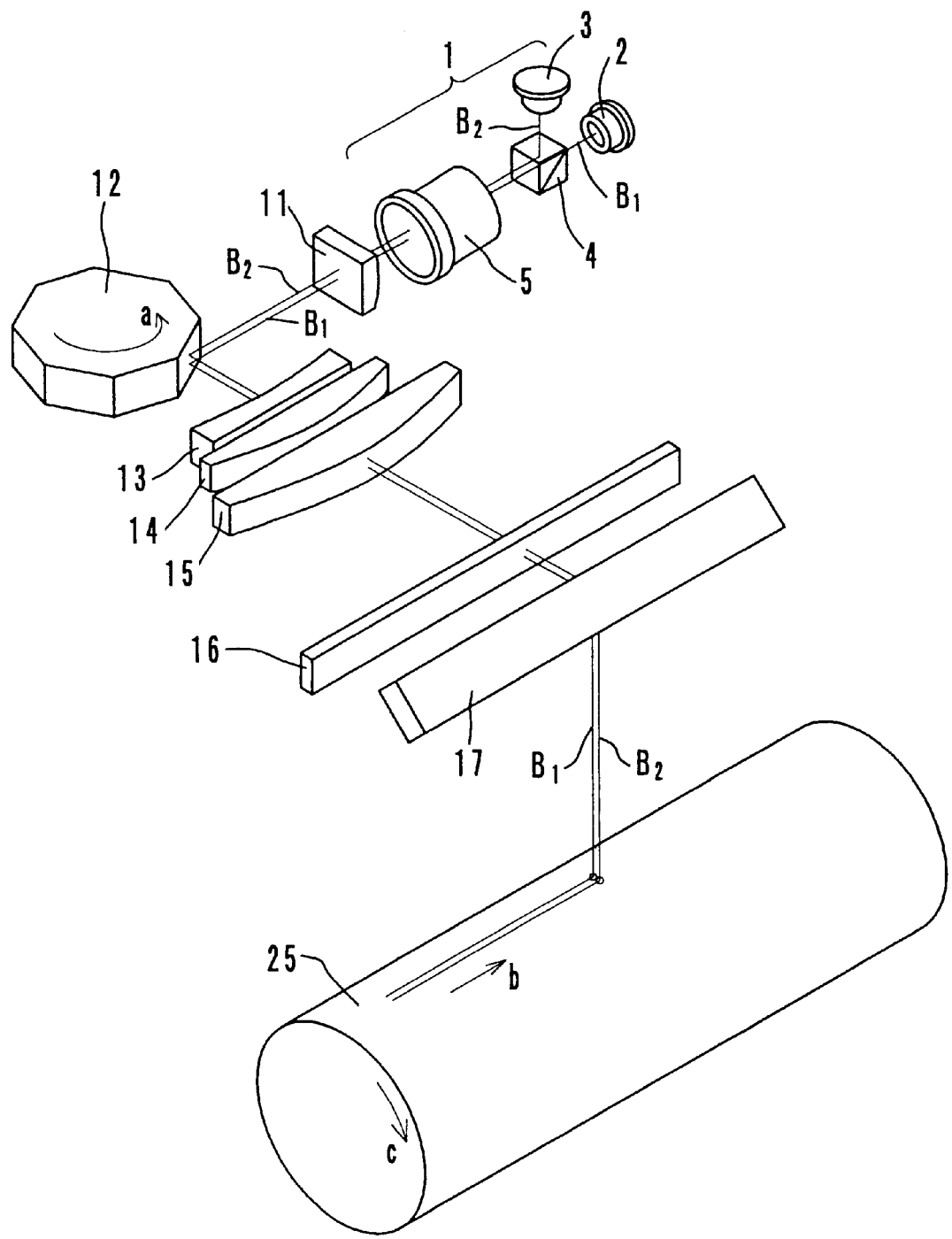
FIG. 1 is a perspective view showing a schematic construction of a light beam scanning optical apparatus according to an embodiment of the present invention.
Figure 2:
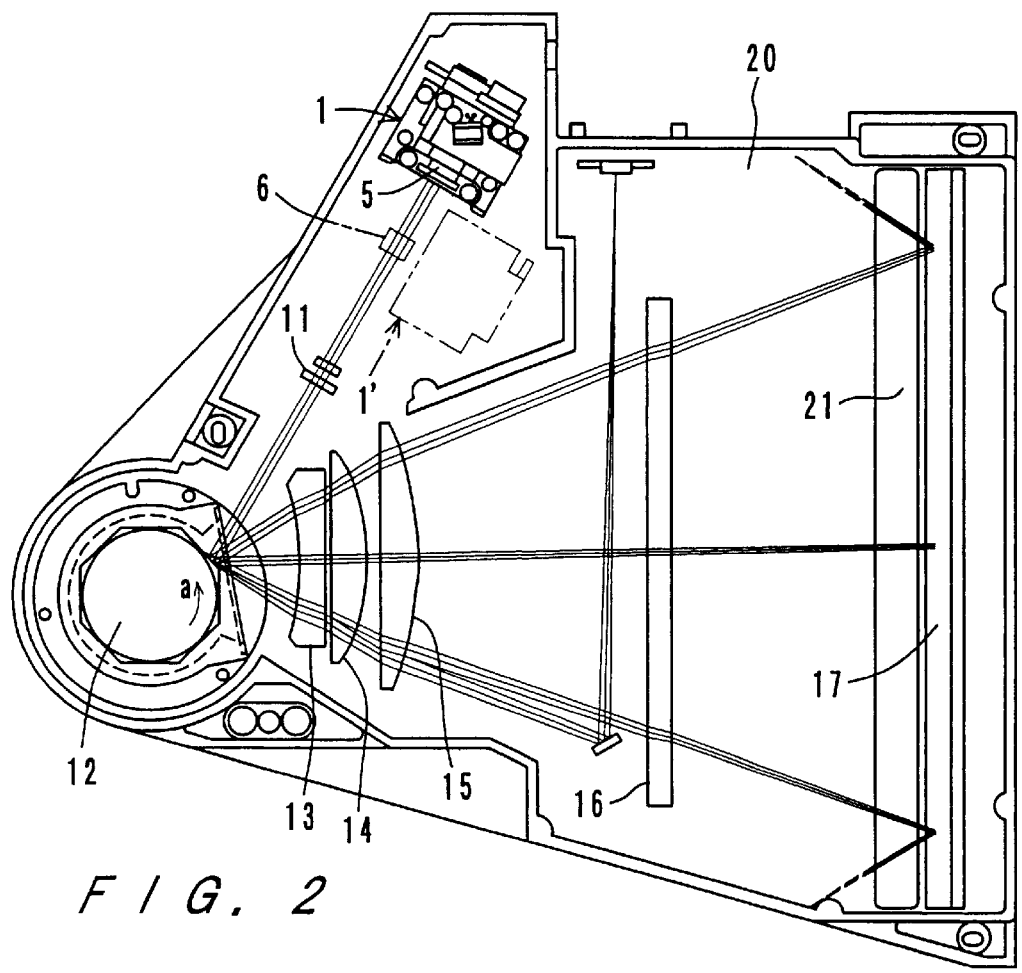
FIG. 2 is a plan view of the above light beam scanning optical apparatus.
Figure 3:
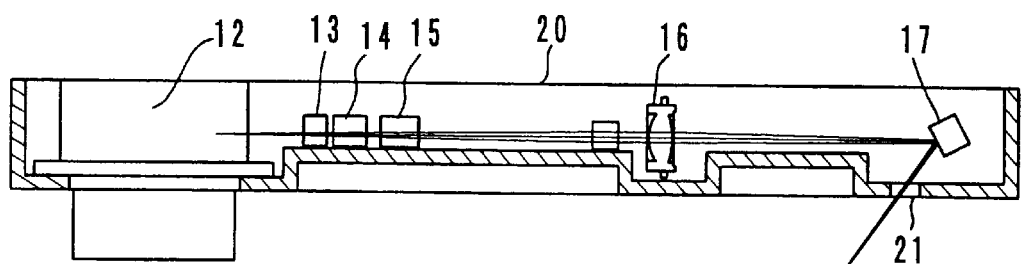
FIG. 3 is a vertical sectional view of the above light beam scanning optical apparatus.
Figure 3:
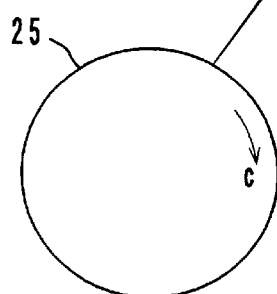
Figure 4:
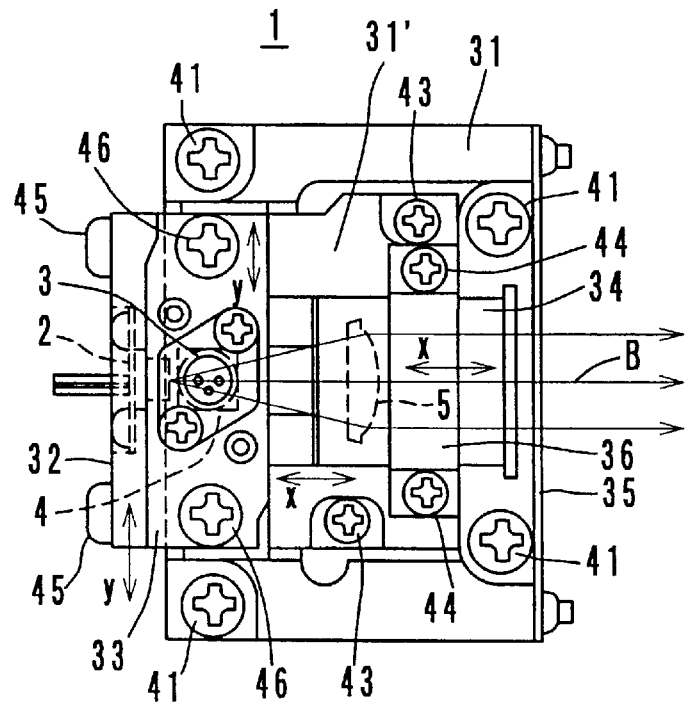
FIG. 4 is a plan view of the assembly structure showing a first example of the assembly structure of a light source device according to the present invention.
Figure 5:
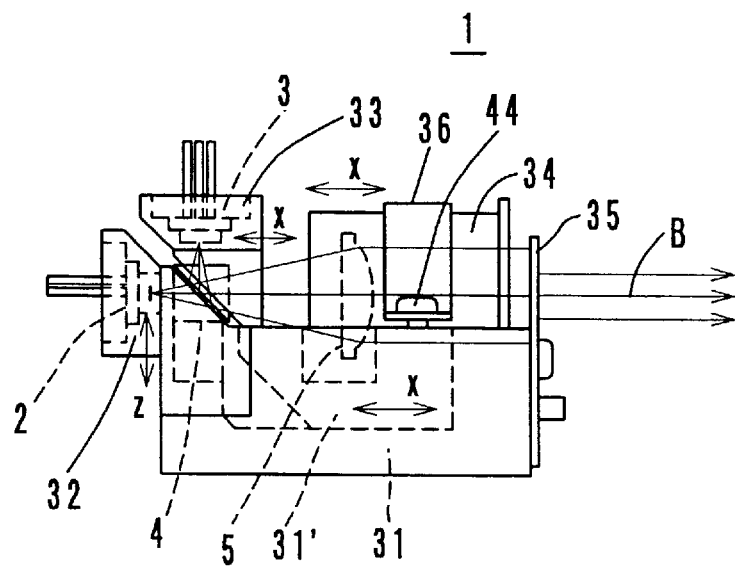
FIG. 5 is a front view of the assembly structure of FIG. 4.
Figure 9:
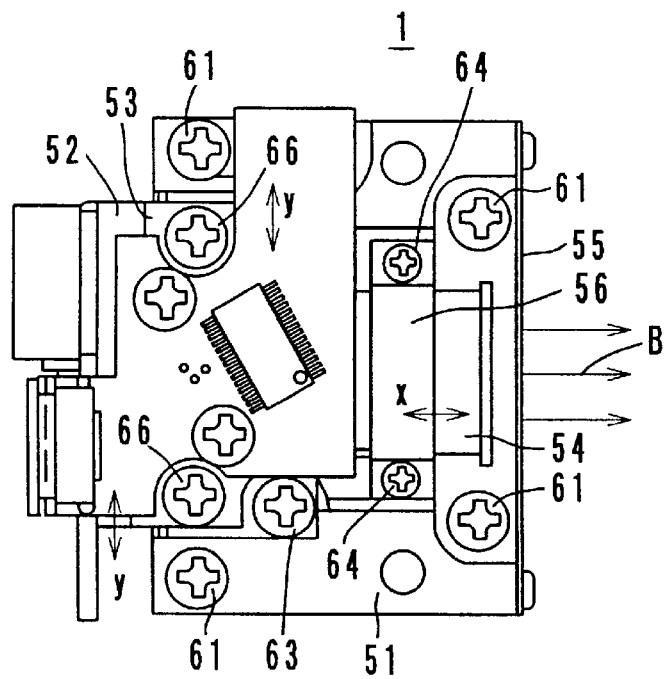
FIG. 9 is a plan view showing a second example of the assembly structure of a light source device according to the present invention.
Figure 10:
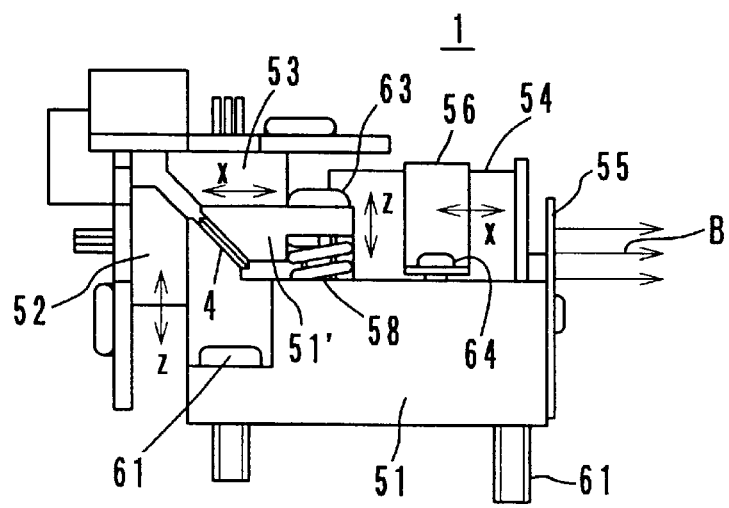
FIG. 10 is a front view of the assembly structure of FIG. 9.
Figure 11:
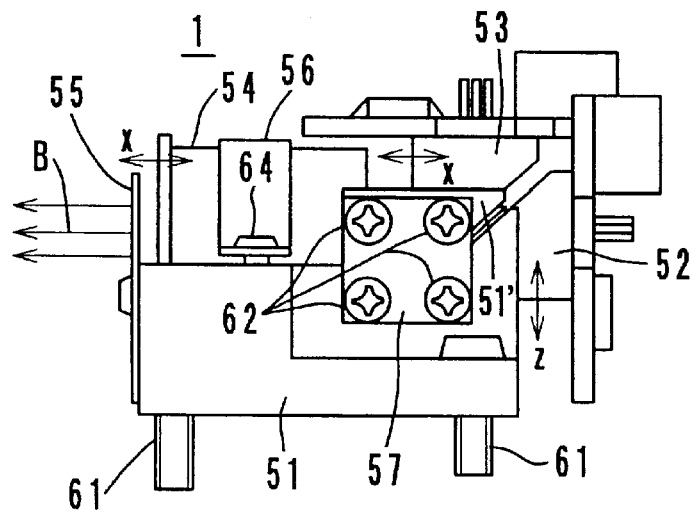
FIG. 11 is a rear view of the assembly structure of FIG. 10.
Figure 12:
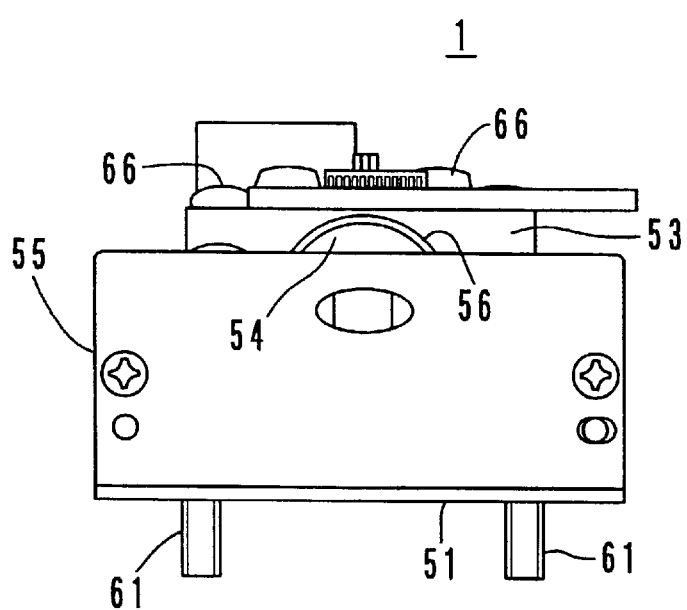
FIG. 12 is a right side view of the assembly structure of FIG. 10.
Figure 13:
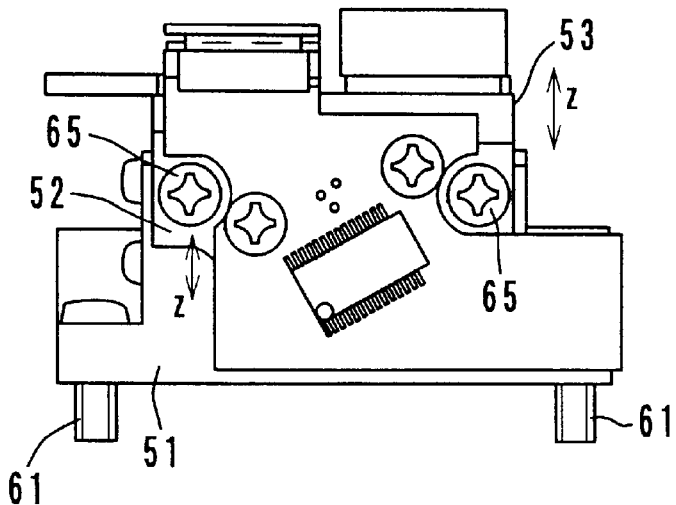
FIG. 13 is a left side view of the assembly structure of FIG. 10.

As shown in FIGS. 1 through 3, a light beam scanning optical apparatus is approximately constructed of a light source unit 1, a cylindrical lens 11, a polygon mirror 12, three fθ-lenses 13, 14 and 15, a cylindrical lens 16, a plane mirror 17 and a housing 20 which houses therein these optical members.

The light source unit 1 is constructed of first and second laser diodes 2 and 3 which emit light beams $B_1$ and $B_2$ respectively, in mutually perpendicular directions, a beam splitter 4 formed by bonding two prisms via a semitransparent layer and a collimator lens 5. The light beam B, emitted from the first laser diode 2 travels straight through the semitransparent layer of the beam splitter 4 and is formed into a parallel bundle of rays (or a convergent bundle of rays) by the collimator lens 5. The light beam $B_2$ emitted from the second laser diode 3 is reflected at an angle of 90° by the semitransparent layer of the beam splitter 4 and is formed into a parallel bundle of rays (or a convergent bundle of rays) by the collimator lens 6. The light beams $B_1$ and $B_2$ are directed to travel in an identical direction by the beam splitter 4, and they travel close to each other at an interval of several micrometers in the sub-scanning direction.

The light beams $B_1$ and $B_2$, emergent from the collimator lens 5, reach the polygon mirror 12 via the cylindrical lens 11. The cylindrical lens 11 converges each of the light beams $B_1$ and $B_2$ in a linear form, elongated in the main scanning direction, on a place in the vicinity of a reflecting surface of the polygon mirror 12. The polygon mirror 12 is rotatively driven at a constant angular velocity in the direction of arrow "a". The light beams $B_1$ and $B_2$ are scanned as deflected at a constant angular velocity on each reflecting surface based on the rotation of the polygon mirror 12, made to pass through the fθ-lenses 13, 14 and 15 and the cylindrical lens 16 and then reflected on the plane mirror 17 to travel downward. Subsequently, the light beams $B_1$ and $B_2$ are made to pass through a slit 21 of the housing 20 and focused on a photosensitive drum 25 as scanned in the direction of arrow "b". Thus, two lines are simultaneously written during one scan in this optical system.

The fθ-lenses 13, 14 and 15 have a function of correcting the main scanning velocities of the light beams $B_1$ and $B_2$ deflected at a constant angular velocity by the polygon mirror 12 to a constant velocity on the photosensitive drum 25, that is, correcting distortion. The cylindrical lens 16 has a power only in the sub-scanning direction similarly to the aforementioned cylindrical lens 11, and the two lenses 11 and 16 cooperate to correct an error of perpendicularity of the reflecting surfaces of the polygon mirror 12.

The photosensitive drum 25 is driven at a constant velocity in the direction of arrow "c", so that an image (electrostatic latent image) is written on the photosensitive drum 25 by the main scanning in the direction of arrow "b" made by the polygon mirror 12 and the fθ-lenses 13, 14 and 15 and the sub-scanning in the direction of arrow "c" made by the rotation of the photosensitive drum 25.

Next, a first example of the assembly structure of the light source unit 1 will be described with reference to FIGS. 4 through 8. FIGS. 4 through 7 show the light source unit 1 in various directions, while FIG. 8 schematically shows the structure. For simplicity of explanation, the structure will be described mainly with reference to FIG. 8. It is to be noted that an x-direction is a direction parallel to an optical axis B of light emergent from the beam splitter 4, a y-direction is a direction perpendicular to the x-direction in a horizontal plane and a z-direction is a direction perpendicular to the x- and y-directions.

This light source unit assembly structure is comprised of base blocks 31 and 31', a first movable retainer block 32 for retaining the first laser diode 2, a second movable retainer block 33 for retaining the second laser diode 3, a lens barrel 34 for retaining the collimator lens 5 and a slit plate 35 (not shown in FIG. 6). The base block 31 is fixed by screws 41 on a horizontal reference surface (floor surface) 22 of the housing 20. The other base block 31' retains the beam splitter 4, and it is mounted by screws 43 on a surface 31a parallel to the optical axis B of the base block 31 and is adjustable in position in the x-direction. The lens barrel 34 is mounted on a surface 31a' parallel to the optical axis B of this base block 31' in a state in which it is fastened by a plate belt 36 and is adjustable in position in the x-direction. The plate belt 36 is fixed at its both end portions by screws 44 on the base block 31'. It is to be noted that the surface 31a' retaining the lens barrel 34 is a V-shaped groove extending in parallel with the optical axis B although not shown.

The first movable retainer block 32 is mounted by screws 45 on a surface 31b (perpendicular to the optical axis B) of the base block 31 and is adjustable in position in the y- and z-directions. The second movable retainer block 33 is mounted by screws 46 on a surface 31b' (parallel to the optical axis B) of the base block 31' and is adjustable in position in the x- and y-directions.

An assembling method and an adjusting method of the assembly structure having the above construction will be now described.

In a state in which the lens barrel 34 is temporarily fixed by the plate belt 36 and the screws 44 on the base block 31' to which the beam splitter 4 is glued, the base block 31' is temporarily fixed by the screws 43 on the base block 31. Further, the first and second movable retainer blocks 32 and 33 are temporarily fixed by screws 45 and 46 on the base blocks 31 and 31', respectively.

The positional adjustment is executed in the following way. First, the screws 43 are loosened, and the base block 31' is moved linearly in the x-direction within a range of clearance between the screws 43 and their mounting holes and is fixed on the base block 31. Thereby, the collimator lens 5 is positioned with respect to the virtual optical axis B. Next, the screws 44 are loosened, and the lens barrel 34 is positioned in the x-direction, thereby executing focus adjustment. Further, the screws 45 are loosened, and the first movable retainer block 32 is moved two-dimensionally in the y- and z-directions within a range of clearance between the screws 45 and their mounting holes. Thereby, the light beam emitting position of the first laser diode 2 is determined.

The above adjustment work is executed on a special adjusting jig, and the light source unit 1 in this state is assembled into the housing 20 in which other optical members have been assembled. Specifically, the base block 31 is fixed on the horizontal reference surface 22 of the housing 20 by the screws 41. Subsequently, the screws 46 are loosened, and the second movable retainer block 33 is moved two-dimensionally in the x- and y-directions within a range of clearance between the screws 46 and their mounting holes. Thereby, the light beam emitting position of the second laser diode 3 is determined.

The housing 20 is covered with a lid member (not shown) after the completion of the aforementioned adjustment work.

Next, a second example of the assembly structure of the light source unit 1 will be described with reference to FIGS.

Figure 14:
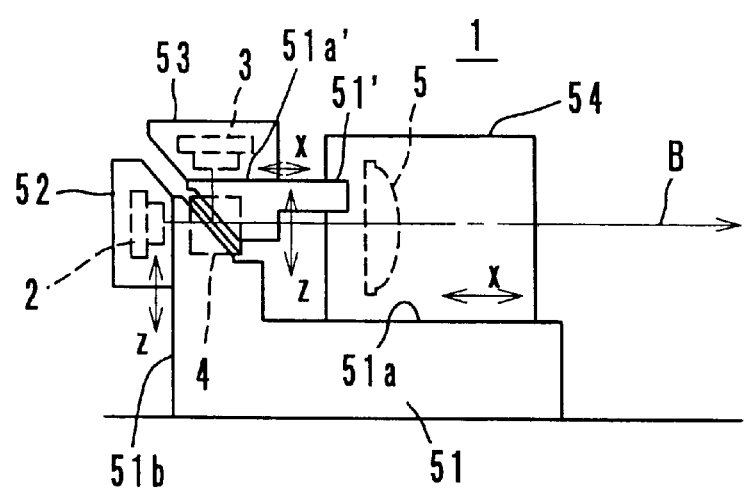
FIG. 14 is a schematic view of the second example of the assembly structure shown in FIGS. 9 through 13.
Figure 15:
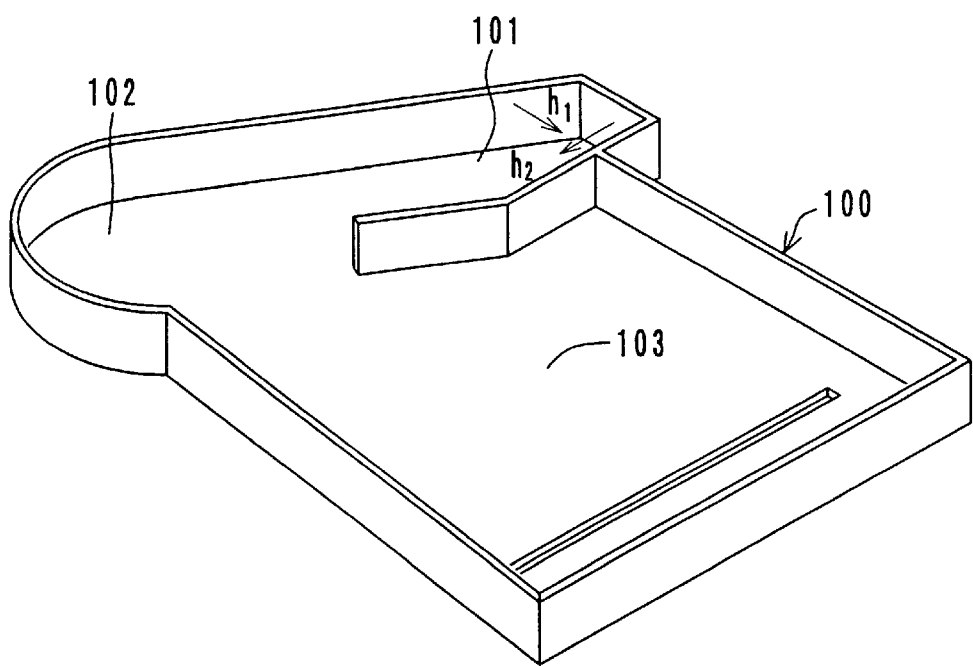
FIG. 15 is a perspective view showing a housing in the prior art.

9 through 14. FIGS. 9 through 13 show the light source unit 1 in various directions, while FIG. 14 schematically shows the structure. For simplicity of explanation, the structure will be described mainly with reference to FIG. 14. This second example basically has a structure similar to that of the aforementioned first example; however, it differs in the point that the second laser diode 3 is made adjustable additionally in the z-direction.

This light source unit assembly structure is constructed of base blocks 51 and 51', a first movable retainer block 52 for retaining the first laser diode 2, a second movable retainer block 53 for retaining the second laser diode 3, a lens barrel 54 for retaining the collimator lens 5 and a slit plate 55. The base block 51 retains the beam splitter 4 and is fixed by screws 61 on a horizontal reference surface (floor surface) 22 of the housing 20. The other base block 51' is fixed on the base block 51 via a bracket 57 and screws 62 on the rear surface side (see FIG. 11) and is pressed by a screw 63 screwed into the base block 51 as urged upward by a coil spring 58 on the front surface side (see FIG. 10). That is, this base block 51' can be vertically moved in the z-direction on the front surface side with the bracket 57 on the rear surface side served as a fulcrum by tightening or loosening the screw 63.

The lens barrel 54 is mounted on a surface 51a parallel to the optical axis B of the base block 51 in a state in which it is fastened by a plate belt 56 and is adjustable in the x-direction. The plate belt 56 is fixed at its both end portions by screws 64 on the base block 51. It is to be noted that the surface 51a for retaining the lens barrel 54 is a V-shaped groove extending in parallel with the optical axis B similarly to the aforementioned first example.

The first movable retainer block 52 is mounted by screws 65 on a surface 51b (perpendicular to the optical axis B) of the base block 51 and is adjustable in position in the y- and z-directions. The second movable retainer block 53 is mounted by screws 66 on a surface 51a' (parallel to the optical axis B) of the base block 51' and is adjustable in position in the x- and y-directions.

An assembling method and an adjusting method of the assembly structure having the above construction will be now described.

The base block 51' is fixed on the base block 51, to which the beam splitter 4 is glued, by the bracket 57 and the screws 62 on the rear surface side, and the screw 63 is screwed into the base block 51 with interposition of the coil spring 58 on the front surface side. Further, the lens barrel 54 is temporarily fixed on the base block 51 by the plate belt 56 and the screws 64. Further, the first and second movable retainer blocks 52 and 53 are temporarily fixed by the screws 65 and 66 on the base blocks 51 and 51', respectively.

Positional adjustment is executed in the following way. First, the screws 64 are loosened, and the lens barrel 54 is positioned in the x-direction, thereby executing focus adjustment. Then, the screws 65 are loosened, and the first movable retainer block 52 is moved two-dimensionally in the y- and z-directions within a range of clearance between the screws 65 and their mounting holes. Thereby, the light beam emitting position of the first laser diode 2 is determined.

The above adjustment work is executed on a special adjusting jig, and the light source unit 1 in this state is assembled into the housing 20 in which other optical members have been assembled. Specifically, the base block 51 is fixed by the screws 61 on the horizontal reference surface 22 of the housing 20. Subsequently, by tightening or loosening the screw 63 with respect to the base block 51, the second movable retainer block 53 is moved in the z-direction together with the base block 51', thereby singly executing focus adjustment of the second laser diode 3. At the same time, the screws 66 are loosened, and the second movable retainer block 53 is moved two-dimensionally in the x- and y-directions within a range of clearance between the screws 66 and their mounting holes. Thereby, the light beam emitting position of the second laser diode 3 is determined.

As described above, in either one of the first and second examples of the assembly structure, the positional adjustment of the first laser diode 2, which has been hindered by the side wall of the housing 20, is executed on the special jig preparatory to the assembling into the housing 20, and all the other adjustment work can be executed from the widely opened upper portion of the housing 20 after the completion of the assembling into the housing 20. Thus, the adjustment work is very easy.

In the above embodiment, as the element for combining the laser beams emitted from the two laser diodes 2 and 3, there may be adopted one in which a flat plate having a non-deflecting half-mirror surface and a flat plate having a filter mirror surface having a deflection characteristic are combined with each other instead of the beam splitter 4 in which the prisms are combined with each other.

Furthermore, as indicated by two-dot chain lines in FIG. 2, it is acceptable to provide another multi-beam type light source unit 1' and make light beams emitted therefrom incident to the polygon mirror 12 by a beam splitter 6. In this case, the light source unit 1 or 1' is selectable driven. For example, the light source unit 1 has a pixel density of 400 dpi, while the light source unit 1' has a pixel density of 600 dpi.

It is to be noted that the light source device and the light beam scanning optical apparatus of the present invention are not limited to the aforementioned embodiments, and they can be altered in various ways within the scope of the invention.

What is claimed is:

1. A light source device to be placed on a horizontal reference surface of a box-shaped housing opened upward, the device comprising:
    a light source which emits a light beam in a direction approximately perpendicular to the horizontal reference surface; and
    a movable retaining member, accessible from above the housing, which retains the light source and is positionally adjustable in a plane perpendicular to the beam emitting direction.

2. A light source device as claimed in claim 1, further comprising:
    a collimator lens which converts the light beam emitted from the light source into a substantially parallel bundle of rays or a convergent bundle of rays; and
    a movable retaining member which retains the collimator lens and is positionally adjustable in a direction in which a light beam emitted from the light source travels.

3. A light source device as claimed in claim 1, wherein the movable retaining member is also positionally adjustable in a direction perpendicular to the horizontal reference surface of the housing.

4. A light source device to be placed on a horizontal reference surface of a box-shaped housing opened upward, the device comprising:
    a first light source which emits a first light beam in a direction approximately parallel to the horizontal reference surface;

a second light source which emits a second light beam in a direction approximately perpendicular to the horizontal reference surface;

a beam combining element which allows the first light beam to pass therethrough and reflects the second light beam in a direction identical to the direction in which the first light beam travels;

a first movable retaining member which retains the first light source;

a second movable retaining member which retains the second light source;

a fixing and retaining member which is fixed on the horizontal reference surface and adjustably retains the first and second movable retaining members; and an adjusting means, accessible from above the housing, which makes the second movable retaining member positionally adjustable, with respect to the fixing and retaining member, in a plane perpendicular to the beam emitting direction of the second light source.

5. A light source device as claimed in claim 4, further comprising:

a collimator lens which converts light beams emitted from the first and second light sources into substantially parallel bundles of rays; and a third movable retaining member which retains the collimator lens and is positionally adjustable in the direction in which light beams emited from the first and second light sources travel.

6. A light source device as claimed in claim 4, wherein the second movable retaining member is also positionally adjustable in a direction perpendicular to the horizontal reference surface of the housing.

7. A light source device as claimed in claim 4, further comprising an adjusting means which makes the first movable retaining member positionally adjustable, with respect to the fixing and retaining member, in a plane perpendicular to the beam emitting direction of the first light source.

8. A light beam scanning optical apparatus comprising:

a box-shaped housing opened upward;

a deflector which scans at least one light beam and deflects the at least one light beam in a deflecting plane approximately parallel to a floor surface of the housing;

a light source which emits a light beam in a plane approximately perpendicular to the deflecting plane of the deflector;

an optical element which reflects a light beam emitted from the light source so as to guide the light beam to the deflector; and a movable retaining member, accessible from above the housing, which retains the light source and is positionally adjustable in a plane perpendicular to the beam emitting direction of the light source.

9. A light beam scanning optical apparatus as claimed in claim 8, further comprising:

a collimator lens which converts a light beam emitted from the light source into a substantially parallel bundle of rays or a convergent bundle of rays; and a movable retaining member which retains the collimator lens and is positionally adjustable in a direction in which a light beam emitted from the light source travels.

10. A light beam scanning optical apparatus as claimed in claim 8, wherein the movable retaining member is also positionally adjustable in a direction perpendicular to the horizontal reference surface of the housing.

11. A light beam scanning optical apparatus comprising:

a box-shaped housing opened upward;

a deflector which scans at least one light beam and deflects the at least one light beam in a deflecting plane approximately parallel to a floor surface of the housing;

a first light source which emits a first light beam in a plane approximately parallel to the deflecting plane of the deflector;

a second light source which emits a second light beam in a plane approximately perpendicular to the deflecting plane of the deflector;

a beam combining element which allows the first light beam to pass therethrough so as to guide the first light beam to the deflector and reflects the second light beam in a direction identical to the direction in which the first light beam travels so as to guide the second light beam to the deflector;

a first movable retaining member which retains the first light source;

a second movable retaining member which retains the second light source;

a fixing and retaining member which is fixed on the floor surface of the housing and retains the first and second movable retaining members as adjustable in position; and an adjusting means, accessible from above the housing, which makes the second movable retaining member positionally adjustable, with respect to the fixing and retaining member, in a plane perpendicular to the beam emitting direction of the second light source.

12. A light beam scanning optical apparatus as claimed in claim 11, further comprising:

a collimator lens which converts light beams of the first and second light sources into substantially parallel bundles of rays or convergent bundles of rays; and a third movable retaining member which retains the collimator lens and is positionally adjustable in a direction in which light beams emitted from the first and second light sources travel.

13. A light beam scanning optical apparatus as claimed in claim 11, wherein the second movable retaining member is also positionally adjustable in a direction perpendicular to the horizontal reference surface of the housing.

14. A light source device as claimed in claim 11, further comprising an adjusting means which makes the first movable retaining member positionally adjustable, with respect to the fixing and retaining member, in a plane perpendicular to the beam emitting direction of the first light source.

15. A light beam scanning optical apparatus comprising:

a box-shaped housing opened upward;

a deflector which scans at least one light beam and deflects the at least one light beam in a deflecting plane approximately parallel to a floor surface of the housing;

a first light source which emits a first light beam in a plane approximately parallel to the deflecting plane of the deflector;

a second light source which emits a second light beam in a plane approximately perpendicular to the deflecting plane of the deflector;

a beam combining element which allows the first light beam to pass therethrough so as to guide the first light beam to the deflector and reflects the second light beam in a direction identical to the direction in which the first light beam travels so as to guide the second light beam to the deflector;

a first movable retaining member which retains the first light source;

a second movable retaining member which retains the second light source;

a fixing and retaining member which is fixed on the floor surface of the housing and retains the first and second movable retaining members as adjustable in position;

a first adjusting means, accessible from above the housing, which makes the second movable retaining member positionally adjustable, with respect to the fixing and retaining member, in a plane perpendicular to the beam emitting direction of the second light source; and a second adjusting means, accessible from above the housing, which makes the second movable retaining member positionally adjustable in a direction substantially perpendicular to the horizontal reference surface of the housing.

16. A light source device as claimed in claim 15, further comprising a third adjusting means which makes the first movable retaining member positionally adjustable, with respect to the fixing and retaining member, in a plane perpendicular to the beam emitting direction of the first light source.

17. A light beam scanning optical apparatus as claimed in claim 15, further comprising:

a collimator lens which converts light beams of the first and second light sources into substantially parallel bundles of rays or convergent bundles of rays; and a third movable retaining member which retains the collimator lens and is adjustable in a direction in which light beams emitted from the first and second light sources travel.

* * * * *